June 10, 1952     W. E. BENUA     2,599,885
AUTOMATIC SPEED-SYNCHRONIZING MECHANISM FOR TWIN ENGINES
Filed Sept. 14, 1950
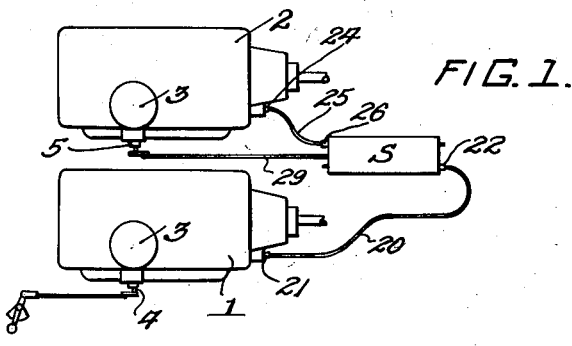
FIG. 1.
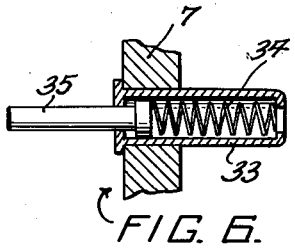
FIG. 6.
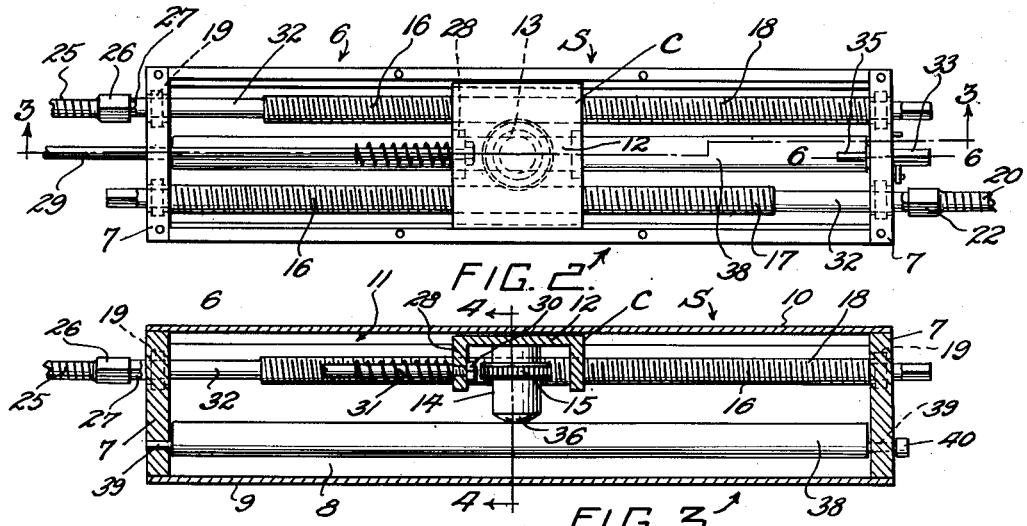
FIG. 2.
FIG. 3.
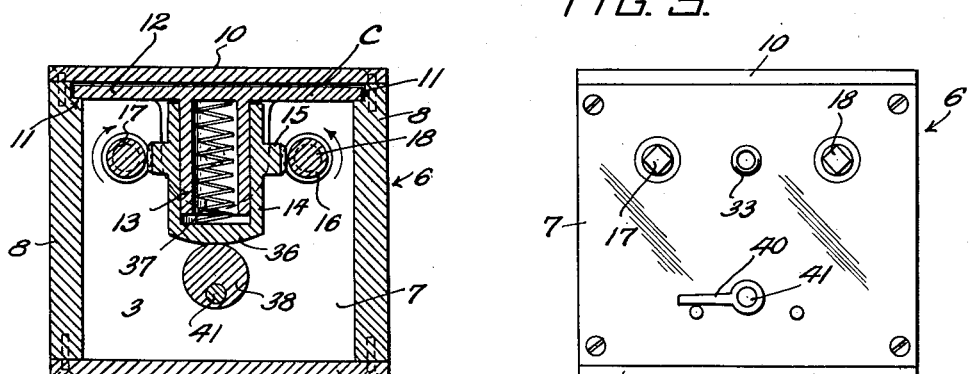
FIG. 4.
FIG. 5.
INVENTOR
William E. Benua
BY *[signature]*
ATTORNEY

Patented June 10, 1952

2,599,885

UNITED STATES PATENT OFFICE 2,599,885

AUTOMATIC SPEED-SYNCHRONIZING MECHANISM FOR TWIN ENGINES

William E. Benua, Columbus, Ohio

Application September 14, 1950, Serial No. 184,806

4 Claims. (Cl. 74—479)

This invention relates to speed-synchronizing mechanism of the type adapted for automatically maintaining substantially uniform the speeds of operation of two or more prime movers employed in effecting a common drive. Often, two or more motors are used in effecting the propulsion of a single vehicle of air or marine craft, and it is important that such marine or aircraft motors operate substantially equally, so that the speed of one of said motors or prime movers may be manually varied and the speed of the other automatically brought into correspondence therewith.

Generally stated, the present invention aims to provide a novel linear type of speed-synchronizing mechanism in which a pair of elongated driven members are rotated about their longitudinal axes by the prime movers associated with the mechanism, and wherein said members are employed to drive a linearly traveling member which remains stationary when said driven members are rotated at the same rate of speed by their respective prime movers, and moves linearly when said members are rotated at different rates of speed; to provide a mechanism of this character in which movement of said linear member is transmitted to the throttle or other speed-governing controls of one of the associated engines or prime movers, whereby to adjust such controls relatively to bring automatically the speed of the governed prime mover into accordance with that of the other piloting prime mover; to provide mechanism of the character set forth embodying a pair of threaded shafts rotatably mounted in spaced parallel relation in a common casing and having arranged therebetween a traveling member including a gear pinion, the latter having the teeth thereof disposed in mesh with the threads of said shafts, whereby to cause said driven member to remain stationary when said shafts are rotated at equal rates of speed but to move longitudinally of and parallel to said shafts when a differential in the rate of rotation of said shafts exists; to provide a mechanism in which rotatably mounted threaded shafts are used meshing with the teeth of an intervening gear pinion arranged for travel between the shafts, and wherein each of the latter at one end thereof is provided with a plain unthreaded portion for arresting linear traveling movement of the intervening member to avoid mechanical injury to the mechanism under extreme conditions of operation; to provide a mechanism of this nature in which provision is made for engaging and disengaging the teeth of the pinion of the driven member with those of the threaded shafts, and, further, to produce a synchronizing mechanism of economical, efficient and durable design, dependable in operation and capable of being readily connected in operative relation with associated internal combustion engines or other prime movers.

Synchronizers of the prior art are characterized by the use of planetary gearings of relatively costly and complex designs, wherein the present invention is distinguished by the employment of linear motion in producing engine-controlling forces, the linear motion making possible simplicity and reliability in construction and operation and reduction in manufacturing costs.

Other objects, characteristics and advantages of my improved synchronizing mechanism may be more fully understood by reference to the following description and the accompanying drawing, wherein:

Fig. 1 is a diagrammatic view of a pair of internal combustion engines, showing the relationship of the latter with the synchronizing mechanism of the present invention;

Fig. 2 is a top plan view of the synchronizing mechanism, the lid of the casing in which the mechanism is mounted being removed to disclose internal structure;

Fig. 3 is a vertical longitudinal sectional view taken through the mechanism on the plane indicated by the line 3—3 of Fig. 2;

Fig. 4 is a vertical transverse sectional view on the line 4—4 of Fig. 3;

Fig. 5 is an end elevational view of the casing in which the synchronous mechanism is contained;

Fig. 6 is a detail sectional view disclosing the resilient stop plunger, the plane of the section being indicated by the line 6—6 of Fig. 2.

As shown in Fig. 1 of the drawings, the present invention is employed in conjunction with a pair of prime movers, such as electric motors, generators, diesel engines, spark-type internal combustion engines or the like. In this instance, the engine indicated at 1 forms the pilot or leading engine, and the engine indicated at 2 the controlled or captive engine. These engines may be of any standard type, such as those employed in the operation of marine and aircraft, each engine having, when a spark-type engine is used, a carburetor 3 for delivering explosive fuel mixtures to the engine cylinders in a manner induced by piston action for compression and ignition in said cylinders. The carburetor of the leading engine is provided with a manually controlled throttle 4, while the throttle 5 of the captive engine 2 is adapted to be automatically operated by the synchronizing mechanism, indicated at S, which forms the present invention. The construction and operation of the mechanism S is such as to cause the captive engine, through control of its carburetor, to operate automatically at the same rate of speed as the main or leading engine 1.

In this regard, the synchronizing mechanism embodies a casing 6 having vertical end walls 7, vertical side walls 8, a horizontal bottom wall 9 and a removable and horizontally disposed lid or cover 10.

The upper and inner edges of the side walls 8 are longitudinally rabbeted or grooved as at 11, such rabbeted or grooved region producing a guideway for the sliding reception of a linearly movable carriage C. In this instance, the latter comprises a base plate 12 having its opposite longitudinal edges slidably positioned in the rabbets or grooves 11. Depending from the central portion of the base plate is a tubular guide member 13, and around this guide member there is slidably positioned the extended hub 14 of a pinion 15.

Gear teeth provided circumferentially on the member 15 mesh with teeth produced by helical threads 16 formed partially on the length of a pair of parallel shafts 17 and 18, the latter being journaled in spaced relation to each other in bearings 19 provided in the end walls 7 of the casing. A flexible drive shaft 20 may be joined at one end with the valve-actuating cam shaft 21 of the leading engine 1, the flexible shaft extending to a socket element 22 which is mounted on the exteriorly projecting squared end 23 of the shaft 17, whereby to cause the rotation of the shaft 17 in unison with the cam shaft 21 of the leading engine. Similarly, the cam shaft 24 of the captive engine 2 drives a flexible shaft 25, the outer end of the latter being equipped with a socket element 26 which is received on the polygonal exteriorly projecting end 27 of the shaft 18, whereby to rotate the shaft 18 in unison with the cam shaft of the captive engine.

Through this arrangement, when the engines 1 and 2 are rotating at the same speed rates, the shafts 17 and 18 of the synchronous mechanism will be rotated at a uniform R. P. M. Under these conditions, the linearly traveling pinion or carriage member 15 will be driven by said shafts in a manner causing the pinion and the carriage C associated therewith to remain in the same longitudinal position in the casing 6. However, if one engine is operated at a speed slightly in excess of that of the other engine, a differential then exists in the R. P. M. of the shafts 17 and 18 with the result that the carriage C travels longitudinally in its casing.

Advantage is taken of this movement of the carriage to control automatically the operation of the control throttle of the captive engine. To this end, the base plate 12 of said carriage has a depending flange 28 formed with an opening in which is secured one end of a rod 29 provided with a head or nut 30, the rod being surrounded by a light coil spring 31.

The threaded shafts 17 and 18 are provided at their opposite ends with plain or unthreaded regions 32 which enable the gear member 15 to be disengaged from the threads of said shafts after the carriage C has traveled a predetermined distance longitudinally in one direction or the other in the casing, the unthreaded portions enabling the movement of the carriage C to be stopped without injury to the mechanism. The spring 31, which surrounds the rod 29, is of such length as to engage with one of the end walls 7 when the carriage C reaches its extreme movement toward the left as viewed in Figs. 2 and 3. At this time the spring 31 will be compressed sufficiently so that on predetermined rotation of the shafts 17 and 18, the teeth of the gear member 15 may be caused to reenter the teeth or thread grooves of the shafts 17 and 18.

Similar action is obtained when the carriage C moves to the extreme of its right position as viewed in Figs. 2 and 3. As shown in Figs. 2 and 6, use is made of a sleeve 33 containing a coil spring 34 which operates on a plunger 35. This plunger is disposed so that it will be engaged by a downturned flange on the base plate and the spring 34 compressed, so that it may exert sufficient pressure on the plunger 35 to cause a retention of the teeth of the gear member 15 with those of the shafts 17 and 18, in the same manner as takes place in reference to the spring 31.

To move the gear member 15 into and out of engagement with the threads of the shafts 17 and 18, the hub 14 of said gear member is provided with a closed lower end 36, arranged below the bottom of the depending tubular guide member 13 of the base plate, a coil spring 37 being confined in the tubular guide member, with the lower end of the coil spring pressing on the closed end 36 of the hub 14 to force the latter downwardly, and thereby remove the teeth of the gear member 15 from meshing relationship with those of the shafts 17 and 18. The operation of the spring 37, as well as the forces created by the rotation of the shafts 17 and 18, are resisted by the action of a longitudinally extending eccentric member 38, the ends of said member being journaled as at 39 in the end walls 7 of the casing. One of the journaled ends may be provided with a manually operated lever 40 by which the eccentric may be rotated about the journaling axis 41 thereof whereby to provide for raising and lowering movement of the pinion member 15 against or in accordance with the forces exercised thereon by the shafts 17 and 18 and spring 37, thereby throwing the synchronizing mechanism into and out of operation at will.

From the above description, it will be apparent that the operator need control manually but one of the engines when the synchronizing mechanism is in operation. Thereafter, said mechanism will automatically control the operation of the other engine to maintain the speeds of said engines equal. If, however, the operator desires to control either of the motors independently of the other, he may readily do this by rendering the synchronizing mechanism inoperative by the manipulation of the lever 40. Similarly, the operator may again throw the synchronizing mechanism into operation for automatically controlling the speed of operation of the captive engine in accordance with the speed of operation of the leading engine by simply operating the lever 40. Furthermore, the synchronizing mechanism will automatically render itself inoperative to control the captive engine in case an excessive differential of rotation of the shafts 17 and 18 is produced by the action of the engines driving the same, this being effected through the disengagement of the teeth of the pinion member 15 with the threads of the shafts 17 and 18 by registration of said pinion member with the plain or unthreaded portions of said shafts. Reengagement of the teeth of the gear member with those of the shafts 17 and 18 is automatically effected, when equal rotation is again imparted to the shafts 17 and 18, by the action of the springs 31 and 34.

It will be understood that the synchronizer of the present invention is characterized by the linear movement which is imparted to its movable control element or carriage, as contrasted with the rotary or planetary type of apparatus used in engine synchronizers of earlier design, avoiding the mechanical complexity which has interfered with the general use of devices of this kind. Through the use of the partially threaded shafts 17 and 18, extreme operation of the carriage C does not injure the apparatus mechanically, since the pinion upon reaching an unthreaded end 32 of the shaft turns freely until operation of the apparatus is stopped, or until the shafts 17 and 18 rotate at equal speeds. When such equality in speed is restored, the springs 31 and 34 move the pinion 15 automatically into engagement with the thread grooves of both shafts. The teeth of the pinion 15 are so cut that vertical movement of the pinion will bring the teeth of the latter into or out of engagement the thread grooves of the shafts 17 and 18.

Although I have shown and particularly described the preferred embodiment of my invention, I do not intend thereby to be limited to the exact construction shown, as various changes, both in the form and relation of the parts thereof, may readily be made without departing from the spirit of the invention and the definitions of the latter as afforded by the appended claims.

I claim:

1. Synchronizing apparatus of the character set forth, comprising: a casing, a pair of parallel longitudinally aligned and transversely spaced screw threaded shafts rotatably mounted in said casing, said shafts having oppositely disposed unthreaded ends arranged within said casing, means for rotating one of said shafts in accordance with the speed of operation of a first prime mover, means for rotating the second of said shafts in accordance with the speed of operation of a second prime mover, a carriage supported by said casing for linear movement in a guideway arranged parallel to said shafts, a toothed member mounted for rotation on said carriage about an axis substantially perpendicular to the longitudinal axes of said shafts and movable perpendicularly with respect to the axes of rotation of said shafts into and out of mesh with the threads of said shafts, said member having teeth meshing with thread grooves on said shafts, whereby a differential in the speed of rotation of said shafts imparts longitudinal movement to said carriage, registration of the toothed member with the unthreaded ends of said shafts serving to arrest movement of said carriage, means engaging said toothed member for moving the latter into and out of mesh with said shafts, and means actuated by longitudinal movement of the carriage for governing automatically the speed of operation of one of said shaft-rotating means.

2. Speed-synchronizing apparatus comprising: a casing, a pair of parallel longitudinally extending and transversely spaced members, bearings provided in the ends of said casing in which said members are rotatably mounted in fixed relative positions, each of said members being provided in a portion of its length with helical teeth, and in another part of its length with a plain portion, independently driven means for rotating said members, a carriage supported by said casing for linear movement parallel to said members, a pinion mounted for rotation on said carriage about an axis perpendicular to the longitudinal axes of said members and movable on said carriage perpendicularly with respect to said members, said pinion having teeth engageable with those on said members, whereby a differential in the speed of rotation of said members imparts longitudinal movement to said carriage, said pinion registering with the plain portions of said members when said carriage reaches extreme positions of longitudinal travel in either direction in said casing, whereby to arrest movement of said carriage, spring means coacting with said carriage to restore meshing engagement of the teeth of said pinion with those of said members when said pinion is in mesh with one or the other of the plain portions of said members, and lever means engaged with said pinion and operable to move the latter perpendicularly with respect to said members to engage or disengage the teeth of said pinion with or from the teeth of said members.

3. In a speed-synchronizing mechanism, a casing, a pair of parallel longitudinally extending and transversely spaced screw shafts, bearing means provided in the ends of said casing for the rotatable support of said screw shafts, independently operating means for rotating each of said shafts, a carriage frame supported by said casing for linear movement parallel to said shafts, a pinion mounted for axial rotation on said carriage and for sliding movement perpendicularly with respect to the axes of rotation of said shafts, said pinion having an elongated hub, a support for said hub depending from said carriage frame, an eccentric device rotatable in said casing and engaged with said hub for raising and lowering said pinion to bring the same into and out of meshing engagement with the teeth of said screw shaft, and an actuator arm extending through one end of said casing and operated by longitudinal movement of said carriage frame.

4. In an engine synchronizing device; a casing; a pair of spaced, parallel, screw-threaded shafts journaled in said casing for axial rotation and having end members projecting outwardly from said casing for connection with a driving source; a carriage mounted in said casing for reciprocating movement in a plane parallel to the axes of rotation of said shafts; a pinion member carried on said carriage for axial rotation and for sliding movement perpendicularly with respect to the axes of rotation of said shafts, said pinion member being movable on said carriage into and out of meshing engagement with said shafts, and said carriage, when said pinion is engaged with said shafts, being movable longitudinally within said casing when said shafts are rotated at unequal speeds and being maintained stationary when said shafts are rotated at equal speeds; means in engagement with said pinion member for moving the latter perpendicularly with respect to said shafts and into and out of meshing engagement with the latter; and an actuator arm connected to and movable with said carriage and extending outwardly from said casing for connection with an engine to be synchronized by said device.

WILLIAM E. BENUA.

REFERENCES CITED

The following references are of record in the file of this patent:

UNITED STATES PATENTS

| Number | Name | Date |
|---|---|---|
| 775,240 | Crowe | Nov. 15, 1904 |
| 2,087,291 | Moross | July 20, 1937 |
| 2,097,933 | McPherren | Nov. 2, 1937 |